United States Patent
Kataoka et al.

(10) Patent No.: US 7,532,981 B2
(45) Date of Patent: May 12, 2009

(54) VEHICLE DEPARTURE DETECTING DEVICE

(75) Inventors: Hiroaki Kataoka, Susono (JP); Seiji Kawakami, Susono (JP); Katsuhiko Iwazaki, Numazu (JP); Chumsamutr Rattapon, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 85 days.

(21) Appl. No.: 11/887,535

(22) PCT Filed: May 26, 2006

(86) PCT No.: PCT/JP2006/311041

§ 371 (c)(1),
(2), (4) Date: Oct. 1, 2007

(87) PCT Pub. No.: WO2006/126743

PCT Pub. Date: Nov. 30, 2006

(65) Prior Publication Data

US 2009/0030613 A1 Jan. 29, 2009

(30) Foreign Application Priority Data

May 27, 2005 (JP) ............................. 2005-156153

(51) Int. Cl.
*B60R 21/00* (2006.01)
*G08G 1/16* (2006.01)
(52) U.S. Cl. ........................ 701/300; 701/36; 340/438
(58) Field of Classification Search ...................... None
See application file for complete search history.

(56) References Cited

U.S. PATENT DOCUMENTS 6,317,057 B1* 11/2001 Lee ............................. 340/901
7,433,769 B2* 10/2008 Tange et al. ................... 701/41
2006/0217860 A1* 9/2006 Ihara ............................ 701/41

FOREIGN PATENT DOCUMENTS

| JP | A 06-274626 | 9/1994 |
|---|---|---|
| JP | A 07-105498 | 4/1995 |
| JP | A 10-81251 | 3/1998 |
| JP | A 2002-163642 | 6/2002 |

(Continued)

OTHER PUBLICATIONS

Katsuhiko Iwazaki et al., U.S. Appl. No. 11/134,301, filed May 23, 2005.

(Continued)

*Primary Examiner*—Michael J. Zanelli
(74) *Attorney, Agent, or Firm*—Oliff & Berridge, PLC

(57) ABSTRACT

Lane width information Winf acquired by a traffic lane detector is retrieved (step S1); when a value of the lane width information Winf is within a predetermined range of change amount relative to a lane width output Wout_old at a previous time step, i.e., not less than (Wout_old+Wdec) nor more than (Wout_old+Winc), Winf is used directly as the lane width output Wout (steps S5→S9→S11→S8); when the value of lane width information Winf is off the predetermined range, i.e., less than (Wout_old+Wdec), (Wout_old+Wdec) is outputted as the lane width output value Wout (steps S5→S9→S10→S8); when the value of lane width information Winf exceeds (Wout_old+Winc), (Wout_old+Winc) is outputted as the lane width output Wout (steps S5→S6→S8).

8 Claims, 8 Drawing Sheets

FOREIGN PATENT DOCUMENTS

JP          2003-337998   * 11/2003

OTHER PUBLICATIONS

Katsuhiko Iwazaki et al., U.S. Appl. No. 11/134,318, filed May 23, 2005.
Seiji Kawakami et al., U.S. Appl. No. 11/136,450, May 25, 2005.
Seiji Kawakami et al., U.S. Appl. No. 11/135,287, May 24, 2005.
Hiroaki Kataoka et al., U.S. Appl. No. 11/138,307, May 27, 2005.
Satoru Niwa et al., U.S. Appl. No. 11/136,449, May 25, 2005.
Chumsamutr Rattapon et al. U.S. Appl. No. 11/138,432, May 27, 2005.

* cited by examiner

VEHICLE DEPARTURE DETECTING DEVICE

TECHNICAL FIELD

The present invention relates to a vehicle deviation determining apparatus. The apparatus detects a traffic lane on which a host vehicle is driving, estimates a path of the host vehicle, and determines whether the host vehicle deviates from the traffic lane.

BACKGROUND ART

There is a known technology of acquiring a road image ahead a vehicle with a camera mounted on the vehicle, detecting a traffic lane on which the host vehicle is driving, by image processing, and determining a possibility that the host vehicle will deviate from the traffic lane, based on the detected traffic lane information and an estimated path of the host vehicle (e.g., cf. Japanese Patent Application Laid-Open No. 7-105498).

This technology is, for example, to determine a point where the vehicle will deviate from the traffic lane, based on an offset, a yaw angle, a curve radius, etc. of the traffic lane and a yaw rate, a steering angle, a vehicle speed, etc. of the host vehicle, and to predict a deviation state on the basis of a distance between this point and the host vehicle and an angle between the estimated path at the point and a lane line of the traffic lane.

DISCLOSURE OF THE INVENTION

Incidentally, when the traffic lane is recognized by image recognition, there are cases where a shadow reflected on the road surface or an obstacle on the road surface is erroneously recognized as a white line (lane line), and where a white line is too faint to obtain sufficient brightness of the white line on a screen, so as to result in failure in recognition of the white line. In such cases, the traffic lane is erroneously recognized and there could arise problems that the vehicle is erroneously determined to deviate though the vehicle maintains driving on the lane, and, conversely, that a delay of determination occurs though the vehicle can deviate.

An object of the present invention is therefore to provide a vehicle deviation determining apparatus capable of reducing erroneous decisions of deviation even in the case where the traffic lane is erroneously recognized.

In order to achieve the above object, a vehicle deviation determining apparatus according to the present invention is a vehicle deviation determining apparatus comprising: traffic lane detecting means for detecting a traffic lane of a road on which a host vehicle is driving; and deviation determining means for determining whether the host vehicle will deviate from the traffic lane, based on a positional relation between the traffic lane and the host vehicle, the apparatus having means for detecting a vehicle speed, wherein the traffic lane detecting means detects the traffic lane at a predetermined position and has a function of restraining a time change rate of the detected traffic lane, and wherein the traffic lane detecting means permits a time change rate larger at a high vehicle speed than at a low vehicle speed. For example, the traffic lane detecting means has a function of restraining the time change rate of the detected traffic lane to within a predetermined value and sets the predetermined value larger at a high vehicle speed than at a low vehicle speed.

According to the present invention, the traffic lane to be detected is the traffic lane at a predetermined position (e.g., at a predetermined distance ahead the host vehicle), and the apparatus has the function of restraining and guarding the time change rate of the detected traffic lane (a lane width or positions of left and right edges of the traffic lane). For example, the guard is implemented so that the time change rate falls within a predetermined threshold (practically, so that an absolute value thereof falls within a threshold). When the vehicle speed is high, the permitted time change rate is set larger. When the guard is implemented so that the time change rate falls within the predetermined threshold, the threshold itself is set larger when the vehicle speed is high. This results in permitting the larger time change rate at a high vehicle speed.

When the position of one edge of the traffic lane is not detected, the traffic lane detecting means detects the traffic lane on the basis of a predetermined lane width. When the predetermined lane width is used as lane width information, the position of one edge can be estimated from the position of the other edge. The lane width information can be acquired without information about the two edges.

The smaller the predetermined value (guard value) in an increase case of the width of the traffic lane, the more an alarm failure preventing effect can be enhanced, but the higher a probability of occurrence of error alarm. On the other hand, the smaller the predetermined value (guard value) in a decrease case of the width of the traffic lane, the more an error alarm preventing effect can be enhanced, but the higher a probability of occurrence of alarm failure. When either the prevention of occurrence of alarm failure or the prevention of error alarm is prioritized, it is preferable to set the permitted time change rate in the increase case of the width of the traffic lane, different from that in the decrease case of the width of the traffic lane.

When the reduction of error alarm is prioritized, the permitted time change rate in the increase case of the width of the traffic lane can be set larger than that in the decrease case of the width of the traffic lane.

BEST MODE FOR CARRYOUT OUT THE INVENTION

The preferred embodiment of the present invention will be described below in detail with reference to the accompanying drawings. For easier understanding of description, identical components will be denoted by the same reference symbols as much as possible in each of the drawings, without redundant description.

Figure 1:
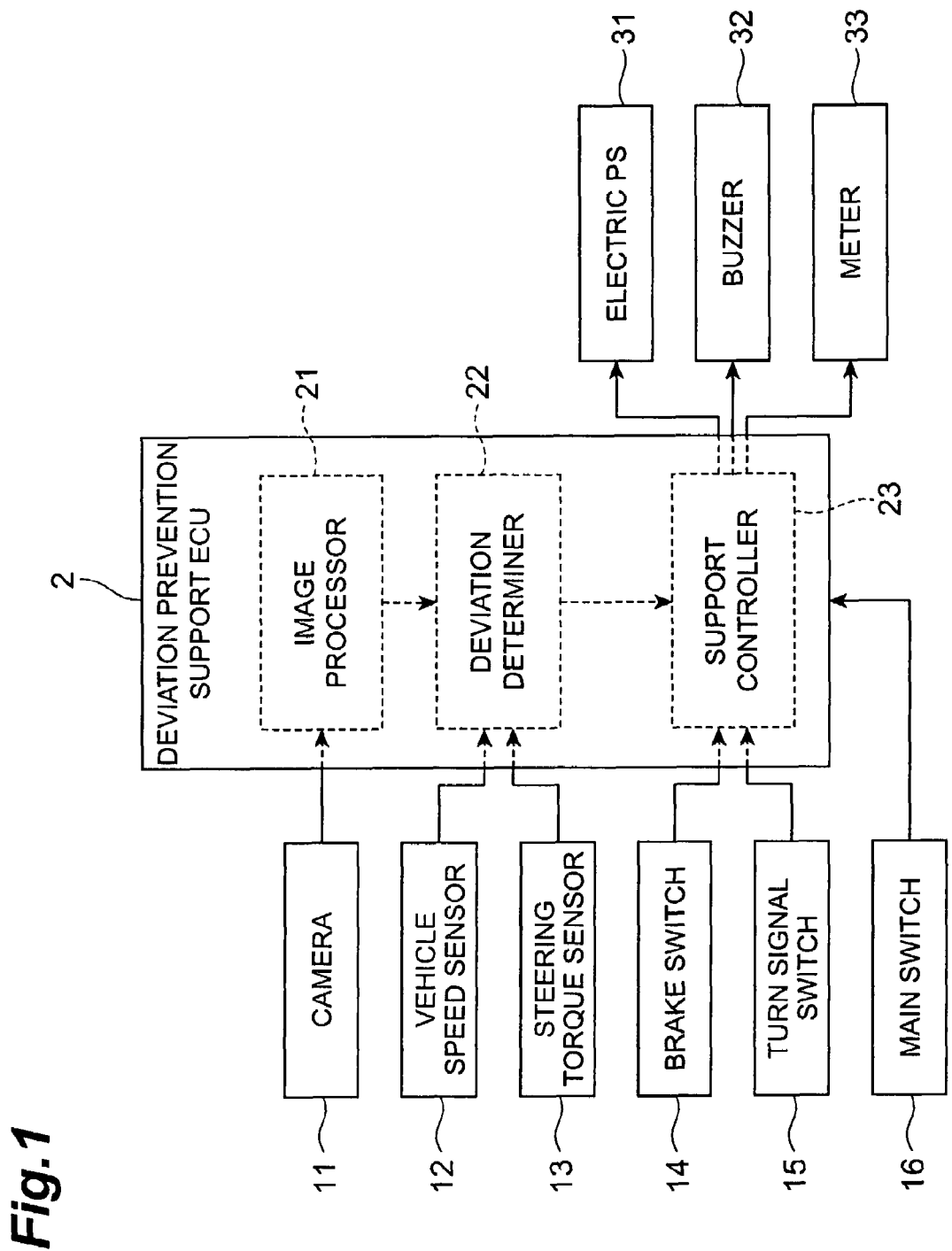
FIG. 1 is a block diagram of a vehicle deviation prevention controller equipped with a vehicle deviation determining apparatus according to the present invention.
Figure 2:
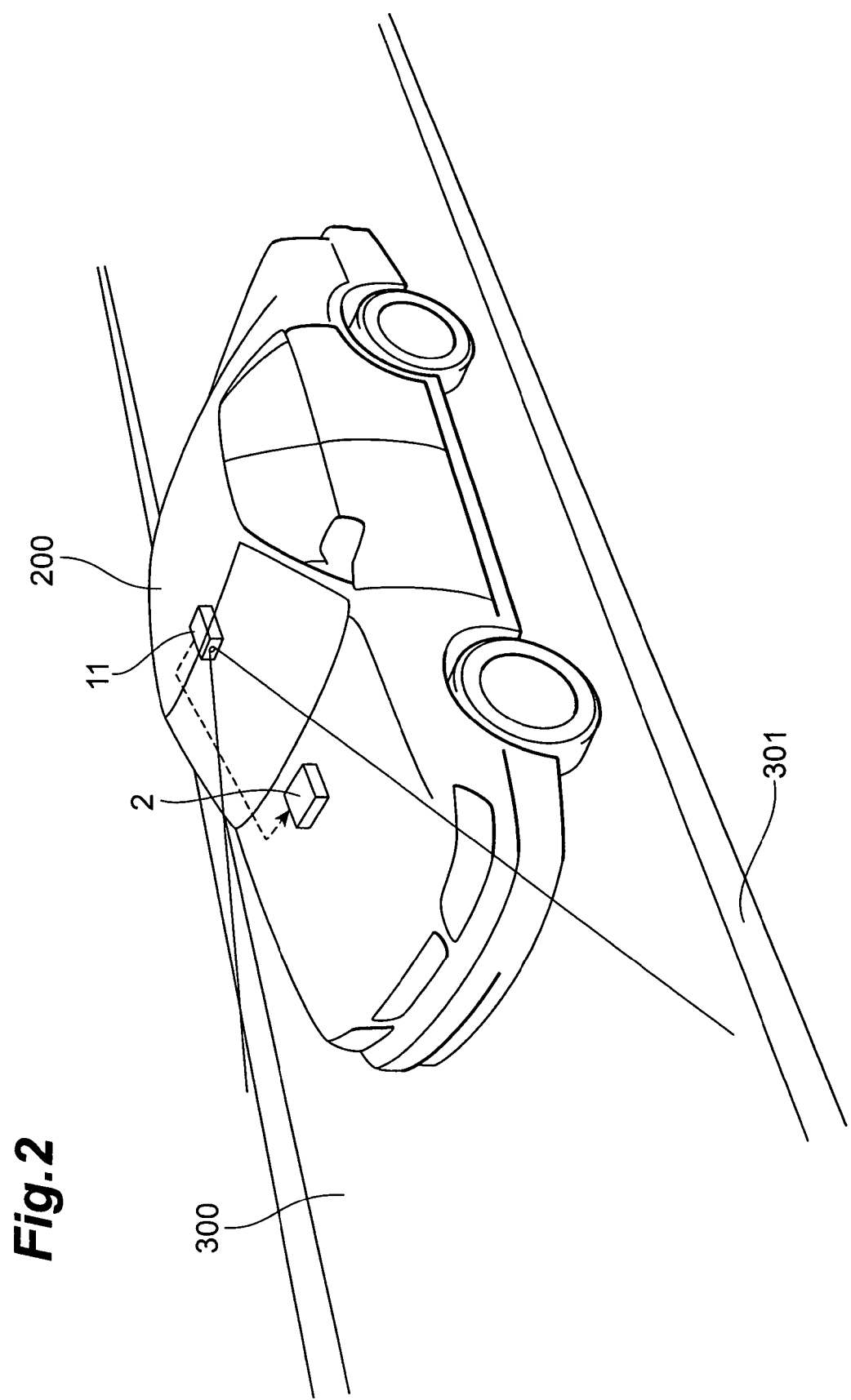
FIG. 2 is a perspective view showing a vehicle equipped with the controller shown in FIG. 1.

FIG. 1 is a block diagram of a vehicle deviation prevention controller including a vehicle deviation determining apparatus according to the present invention, and FIG. 2 is a perspective view showing a vehicle equipped therewith. This vehicle deviation prevention controller (hereinafter referred to simply as a controller) 100 is a control unit for determining a possibility of deviation of a vehicle from a lane and for, with a possibility of deviation, notifying a driver of the fact and thereby preventing the deviation.

The controller 100 is composed mainly of a deviation prevention support ECU 2. This deviation prevention support ECU 2 is composed of a combination of a CPU, a ROM, a RAM, other storages, etc., and has an image processor 21, a deviation determiner 22, and a support controller 23. Each of the parts 21-23 may be sectionalized on a hardware basis; some or all of the hardware devices may be shared as sectionalized on a software basis; they may be configured by a plurality of software applications sharing a part of each; or each may be a part of one software application.

The image processor 21 performs image processing to recognize traffic lane lines (which can be white lines or yellow lines drawn on roads, blocks placed on or buried in roads, or the like and which will be referred to hereinafter simply as white lines) defining the both edges of a traffic lane on which the host vehicle is driving, from image information acquired by a camera 11 for acquiring an image ahead the vehicle, thereby recognizing the traffic lane, and outputs information about the recognized traffic lane (curve R, offset, yaw angle, etc.).

The deviation determiner 22 estimates a predicted arrival position of the host vehicle after a predetermined time from vehicle speed information acquired by a vehicle speed sensor 12 (e.g., wheel speed sensors located at the respective wheels) and steering torque information acquired by a steering torque sensor 13 (which is located on a steering shaft and which detects a steering torque exerted by a driver), and determines a possibility of deviation of the vehicle from the traffic lane, based on the predicted arrival position and the traffic lane information recognized by the image processor 21.

The support controller 23 is a control part that performs a support of prevention of deviation, based on the result of the determination by the deviation determiner 22, and in the present embodiment the support controller 23 issues an alarm to the driver, as a support of prevention of deviation. An electric power steering system (PS) 31, a buzzer 32, and a meter 33 are connected as alarming means to the support controller 23. The support controller 23 also receives output signals from a brake switch 14 and from a turn signal switch 15.

An output signal from a main switch 16 is fed to the deviation prevention support ECU 2 to permit the driver to switch permission/prohibition of execution of the deviation prevention support.

The camera 11 is located in the upper part of the front window of vehicle 200 (e.g., on the back side of a rearview mirror) as shown in FIG. 2, and acquires an image ahead the vehicle 200, i.e., an image of a traffic lane 300 ahead the vehicle (including white lines 301). The camera 11 may be located anywhere (e.g., in the front part of the vehicle body) on the vehicle body as long as it can capture the image ahead the vehicle.

First, the basic operation of the controller 100 of the present invention will be described in a situation in which the main switch 16 is set on.

The camera 11 first acquires a moving picture ahead the vehicle, for example, at the TV frame rate and outputs the moving picture to the image processor 21. The image processor 21 performs image recognition processing using a known image processing technique such as edge detection, to recognize positions of white lines 301 at the two edges of the traffic lane 300, and outputs predetermined white line recognition information.

The deviation determiner 22 obtains a predicted arrival position at a certain predicted deviation time (TLC: Time to lane crossing) on the basis of vehicle information acquired by the vehicle speed sensor 12 and the steering torque sensor 13, determines whether the vehicle will be located within the traffic lane 300 at the TLC (i.e., whether the vehicle will deviate), based on the predicted arrival position and the white line recognition information acquired from the image processor 21, and, when it determines that the vehicle will deviate from the traffic lane 300, it outputs the determination of the deviation possibility to the support controller 23.

When the support controller 23 receives the information indicating the deviation possibility, from the deviation determiner 22, it activates the buzzer 32, displays the information at a pertinent location in the meter 33, and actuates an electric motor of the electric PS 31 to exert a predetermined alarm torque on the steering wheel, thereby notifying the driver of a risk of deviation. When the driver is in a braking operation (i.e., when the brake switch 14 is on), or when the driver manipulates a direction indicator for change of lane or for preparation for a right or left turn or the like (i.e., when the turn signal switch 15 is on), the support controller 23 determines that there is no need for notifying the driver of the risk of deviation, and performs none of the various alarms.

Figure 3:
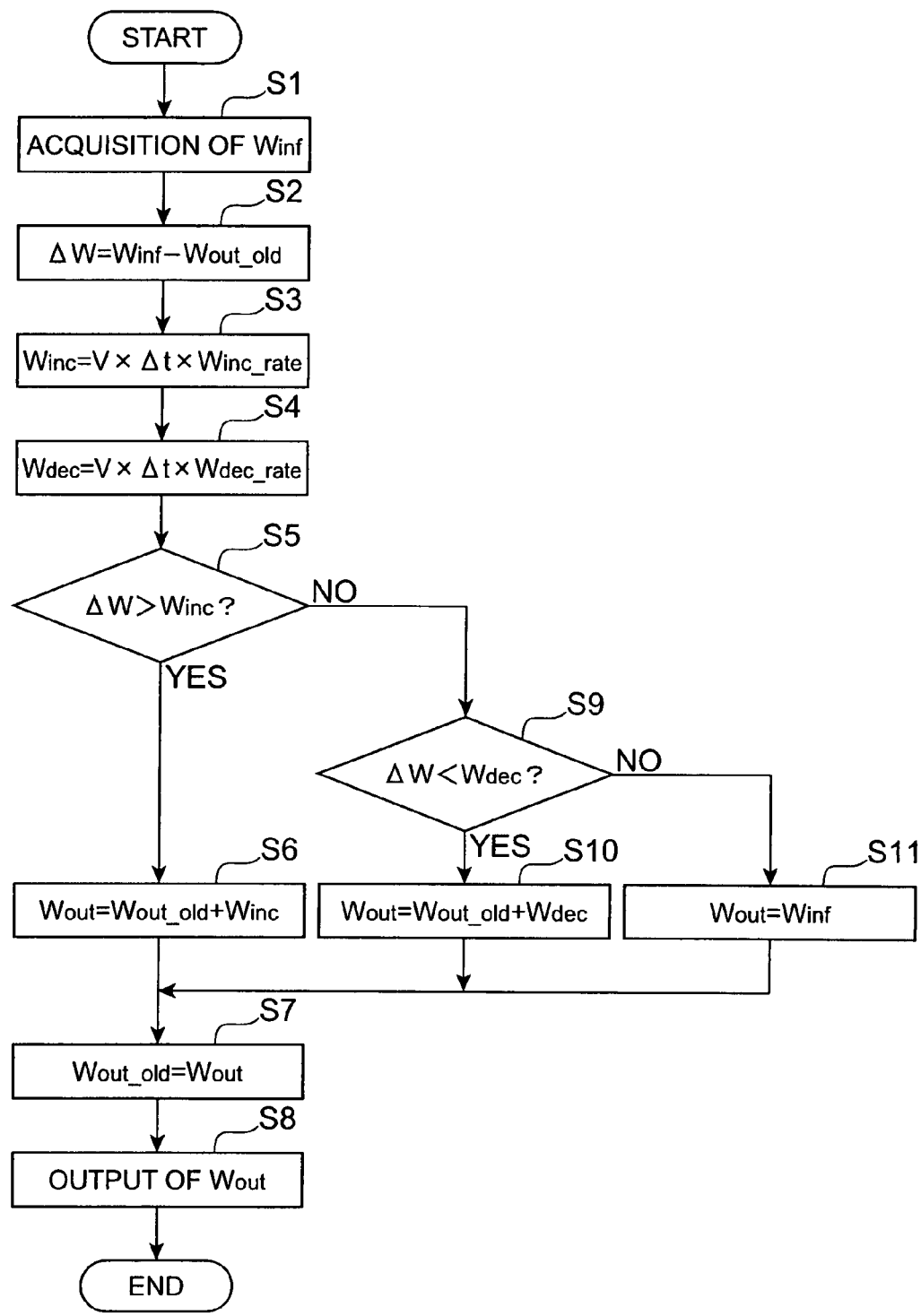
FIG. 3 is a flowchart for explaining a lane width guard process in the apparatus of FIG. 1.

The vehicle deviation determining apparatus according to the present invention performs a guard process of the lane width in detection of the traffic lane. This guard process will be specifically described below. FIG. 3 is a flowchart for explaining this guard process. This process is executed before execution of the deviation determination and at every predetermined time step in the deviation determiner 22. The deviation determination is performed based on lane width information obtained here.

The first step is to acquire lane width information Winf from the white-line recognition information acquired by the image processor 21 (step S1). The next step is to obtain a change amount ΔW of the lane width (step S2). This ΔW is a difference between Winf and a lane width output Wout_old at a previous time step. The next step is to obtain a maximum lane-width increase Winc (step S3). This Winc is a product of a vehicle speed V, an arithmetic cycle (time step) Δt, and a preset lane-width increase allowance per unit driving distance (1 m), Winc_rate. This Winc_rate takes a positive value. The subsequent step is to obtain a maximum lane-width decrease Wdec (step S4). This Wdec is a product of a vehicle speed V, an arithmetic cycle Δt, and a preset lane-width decrease allowance per unit driving distance, Wdec_rate. This Wdec_rate takes a negative value. Absolute values of Winc_rate and Wdec_rate may be the same, or may be different values. In this example, |Winc_rate|>|Wdec_rate|. The reason for it will be described later.

The next step is to compare ΔW with Winc (step S5). When ΔW>Winc, the processing shifts to step S6 to set Wout_old+ Winc as the lane width output Wout, and Wout_old is replaced with Wout (step S7). Thereafter, Wout is outputted (step S8) and the processing is terminated.

When it is determined in step S5 that ΔW is not more than Winc, the processing shifts to step S9 to compare ΔW with Wdec. When ΔW<Wdec, the processing shifts to step S10 to set Wout_old+Wdec as the lane width output Wout, and then the processing shifts to step S7 to replace Wout_old with Wout in the same manner as above. Thereafter, Wout is outputted (step S8) and the processing is terminated.

When it is determined in step S9 that ΔW is not less than Wdec, i.e., when ΔW is not less than Wdec and is less than Winc, the processing shifts to step S11 to set Winf as Wout, and then the processing shifts to step S7 to replace Wout_old with Wout in the same manner as above. Thereafter, Wout is outputted (step S8) and the processing is terminated.

This guard process is configured as follows: when the value of the lane width information Winf is within the range of the predetermined change amount with respect to the lane width output Wout_old at the previous time step, i.e., when Winf is not less than (Wout_old+Wdec) nor more than (Wout_old+Winc), Winf is outputted as the lane width output Wout as it is; when Winf is off the predetermined range, i.e., when Winf is less than (Wout_old+Wdec), (Wout_old+Wdec) is outputted as the lane width output Wout; when Winf exceeds (Wout_old+Winc), (Wout_old+Winc) is outputted as the lane width output Wout.

The allowances are set for the change amount of the lane width as described above to restrain the change amount outside the allowable range, thereby restraining a rapid change of the lane width caused by error recognition or the like. When the vehicle speed is large, the allowances for the change amount are set larger, whereby the guard values can be set tighter in a low vehicle speed range than in a high vehicle speed range. This suppresses occurrence of error alarm and alarm failure due to error recognition of the lane more likely to occur in the low vehicle speed range than in the high vehicle speed range.

Figure 4:
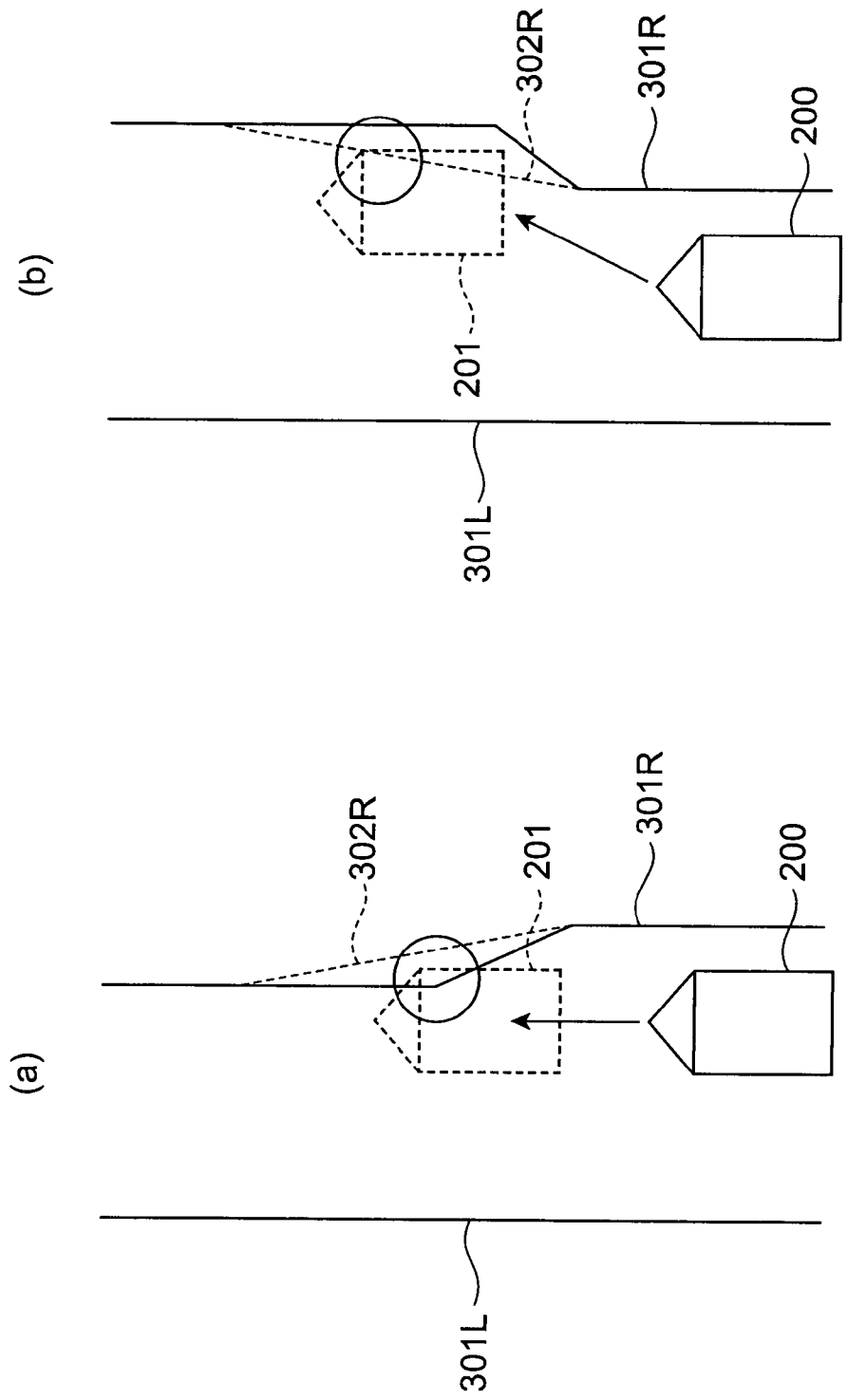
FIG. 4 illustrates possible problems when absolute values of guard values are small with respect to a change of a lane width in practical lanes.

The smaller the absolute values of the guard values are set, the more the guard process (filter process) is effected with the actual change of the lane width being off the guard values. FIGS. 4(a) and (b) show possible problems when the absolute values of the guard values are small with respect to the change of the lane width in practical lanes.

In a zone where the actual lane width decreases, as shown in FIG. 4(a), a right white line 302R estimated by the guard process is located outside an original right white line 301R. Even in this case where a predicted arrival position 201 of the vehicle is expected to deviate from the right white line 301R, a determination of a deviation is not made unless the vehicle deviates from the predicted right white line 302R, and no alarm is issued (alarm failure).

Conversely, in a zone where the actual lane width expands, as shown in FIG. 4(b), the right white line 302R estimated by the guard process is located inside the original right white line 301R. Even in this case where the predicted arrival position 201 of the vehicle is expected to pass inside the right white line 301R, a prediction of a deviation is made to issue an alarm if the vehicle is predicted to deviate from the predicted right white line 302R to the right. Therefore, an error alarm is made.

In order to prevent the error alarm and alarm failure due to the small guard rates as described above, it is necessary to set the guard rates large to some extent, and, particularly, the allowances for the lane width change rate per time are preferably set larger with increase in the vehicle speed.

Figure 5:
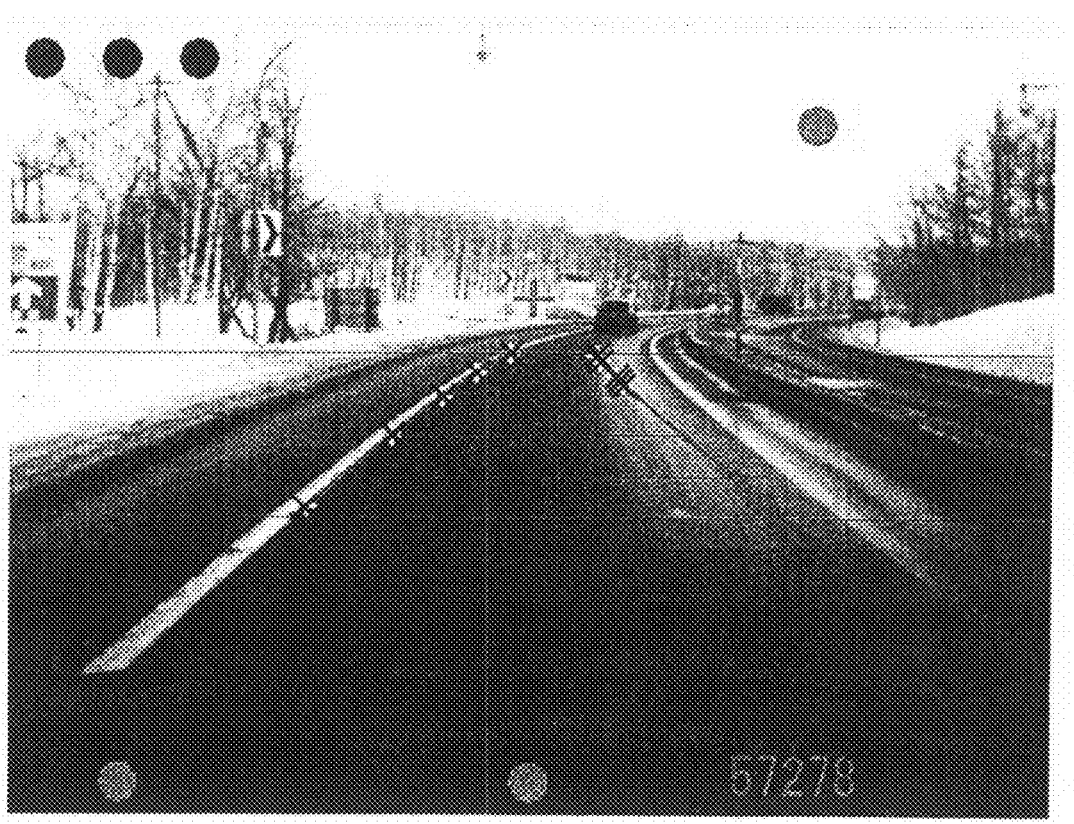
FIG. 5 is an image showing a situation in which snow accumulated near a white line on a road is erroneously recognized as a white line.
Figure 6:
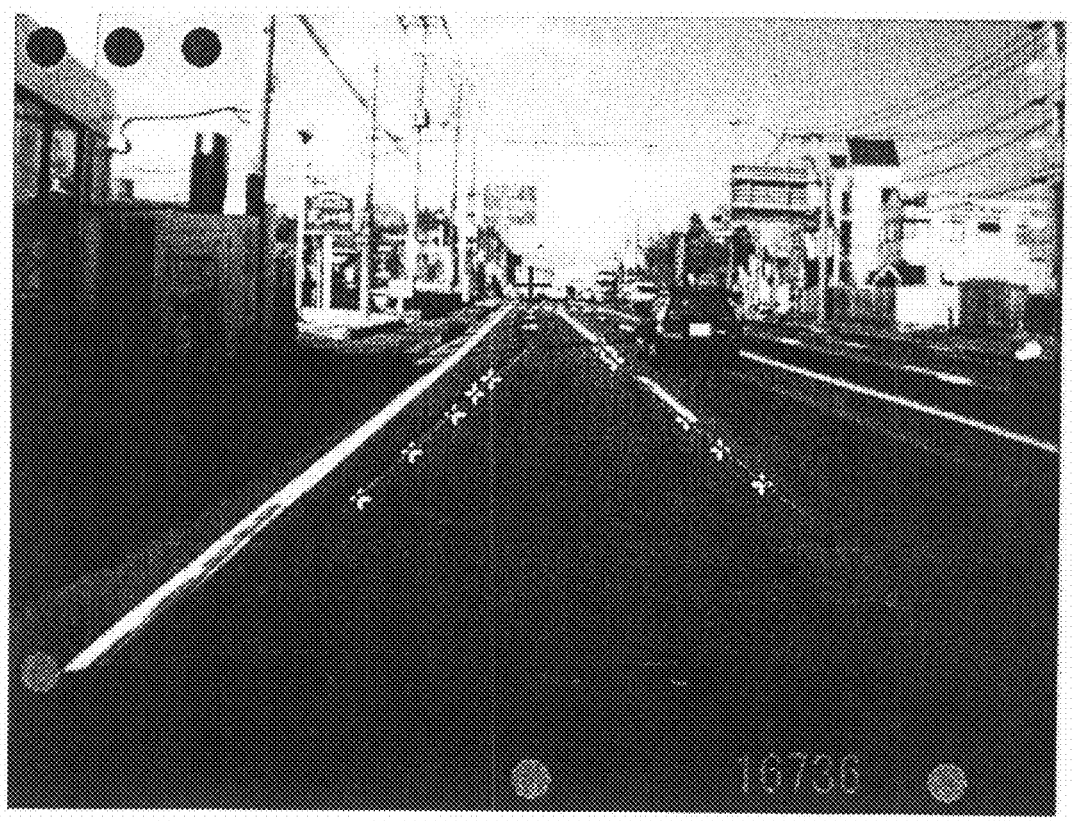
FIG. 6 is an image showing a situation in which a shadow of a power pole reflected on a road surface is erroneously recognized as a white line.

The above described the actual decrease and increase cases of the lane width, but the error recognition also occurs in cases where the lane width rapidly changes because of error recognition of the traffic lane. FIGS. 5 and 6 exemplify images acquired with the camera 11, which can cause such error recognition. FIG. 5 shows a case where snow accumulated near a white line on a road is erroneously recognized as a white line. FIG. 6 shows a case where a shadow of a power pole reflected on a road is erroneously recognized as a white line. In the two images marks × indicate the place recognized as the position of the white line by the image processing. It is erroneously recognized in either case that the lane became suddenly narrower than the actual lane. The guard values are preferably set small in order to suppress the sudden decrease and increase of the lane width caused by such error recognition.

Incidentally, the probability of occurrence of error recognition due to such sudden change of the lane width is low on motor highways (including express highways) and main arterial highways on which vehicles drive at high speed, and the error recognition is likely to occur on general roads (general national roads, prefectural roads, municipal roads, etc.) on which vehicles drive at relatively low speed. In the present embodiment, therefore, the allowances for the lane width change rate are set large in the high vehicle speed range, while the allowances for the lane width change rate are set small in the low vehicle speed range, thereby enabling the error alarm and alarm failure to be effectively suppressed.

As the absolute value of the lane-width increase allowance in the lane-expanding case is set smaller, as apparent from FIG. 4(b), the alarm failure preventing effect is more enhanced, while the error alarm occurrence rate increases. On the other hand, as the absolute value of the lane-width decrease allowance in the lane-decreasing case is set smaller, as apparent from FIG. 4(a), the error alarm preventing effect is more enhanced, while the alarm failure occurrence rate increases. Therefore, setting tendencies of the guard values of the increase allowance and the decrease allowance differ depending upon which is preferentially suppressed between the error alarm and the alarm failure. In order to maintain and enhance driver's reliability on the apparatus, it is preferable to give preference to reduction of error alarm over reduction of alarm failure, and in that case, as described above, it is preferred that the absolute value of the lane-width increase allowance be set larger than the absolute value of the lane-width decrease allowance. Namely, the permitted time change rate of the traffic lane in the lane width-increasing case is set larger than that in the lane width-decreasing case, whereby occurrence of error alarm can be reduced.

Figure 7:
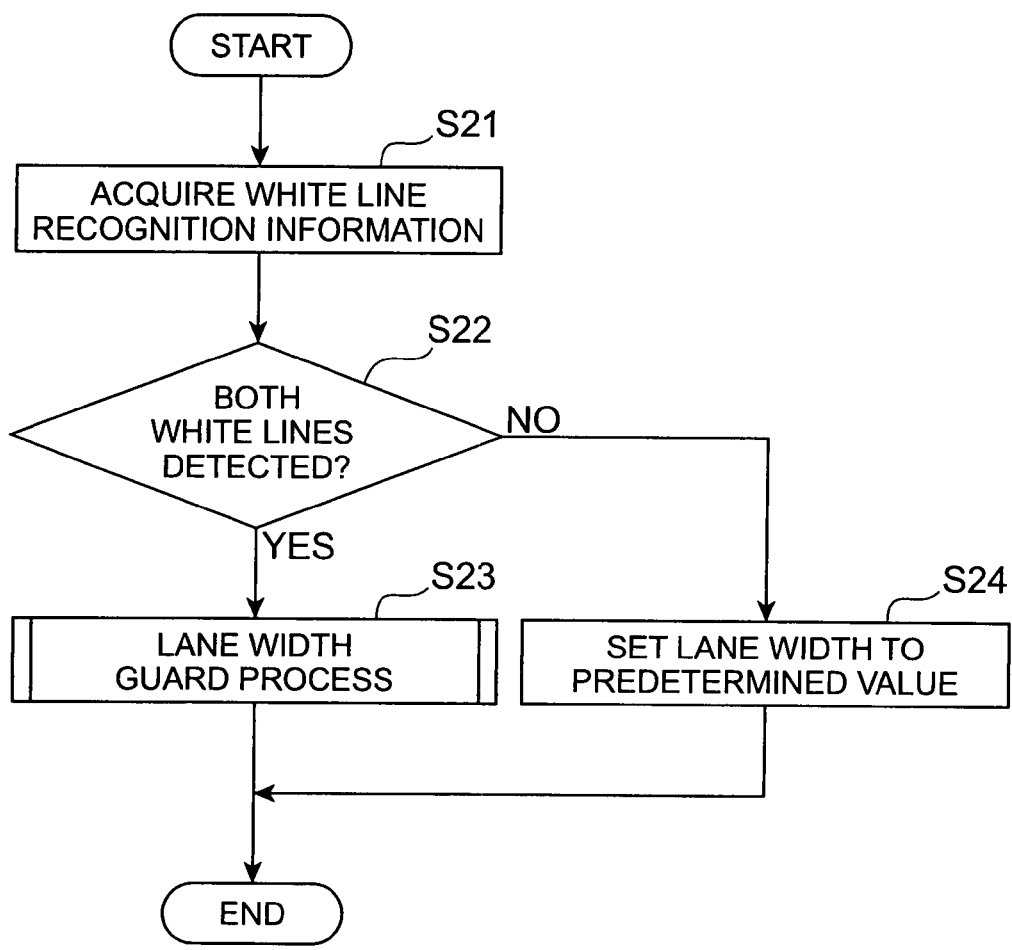
FIG. 7 is a flowchart for explaining processing in a case where no white line is detected.

The processing of FIG. 3 is based on the assumption that the white line information can be acquired, but there are cases where no white line can be detected for reasons including a situation in which the image processor 21 fails to recognize a white line itself in the image acquired by the camera 11, a situation in which the white line itself faded away on a road, and so on. FIG. 7 is a flowchart for explaining a process in such cases where no white line is detected.

The first step is to acquire the white line recognition information (step S21). The next step is to determine whether the left and right white lines both are detected (step S22). When the both white lines are detected, the processing shifts to step S23 to perform the lane width guard process. This process is the processing shown in FIG. 3, and the processing is terminated after completion of the lane width guard process. On the other hand, when in step S22 either one of the white lines is not recognized, the processing shifts to step S24 to set the lane width to a predetermined value, and the processing is then terminated.

The predetermined value set herein may be a fixed value, or a lane width may be set, for example, by acquiring road information from a navigation system. The information acquired herein from the navigation system may be the lane width itself, or the information acquired may be a type of a driving road to permit a lane width to be set according to the type. The reason is that the lane width is set wide for the motor highways such as express highways, and for the main arterial highways, but is set narrow for the prefectural roads and municipal roads. The information about the lane width (including the case of the information about the type of the road) may be acquired by road-vehicle communication or the like. It is also possible to use an average of lane widths in a certain zone before the line detection failure zone and before a change of the lane width. In this case the lane width information closer to actual measurement can be utilized.

Figure 8:
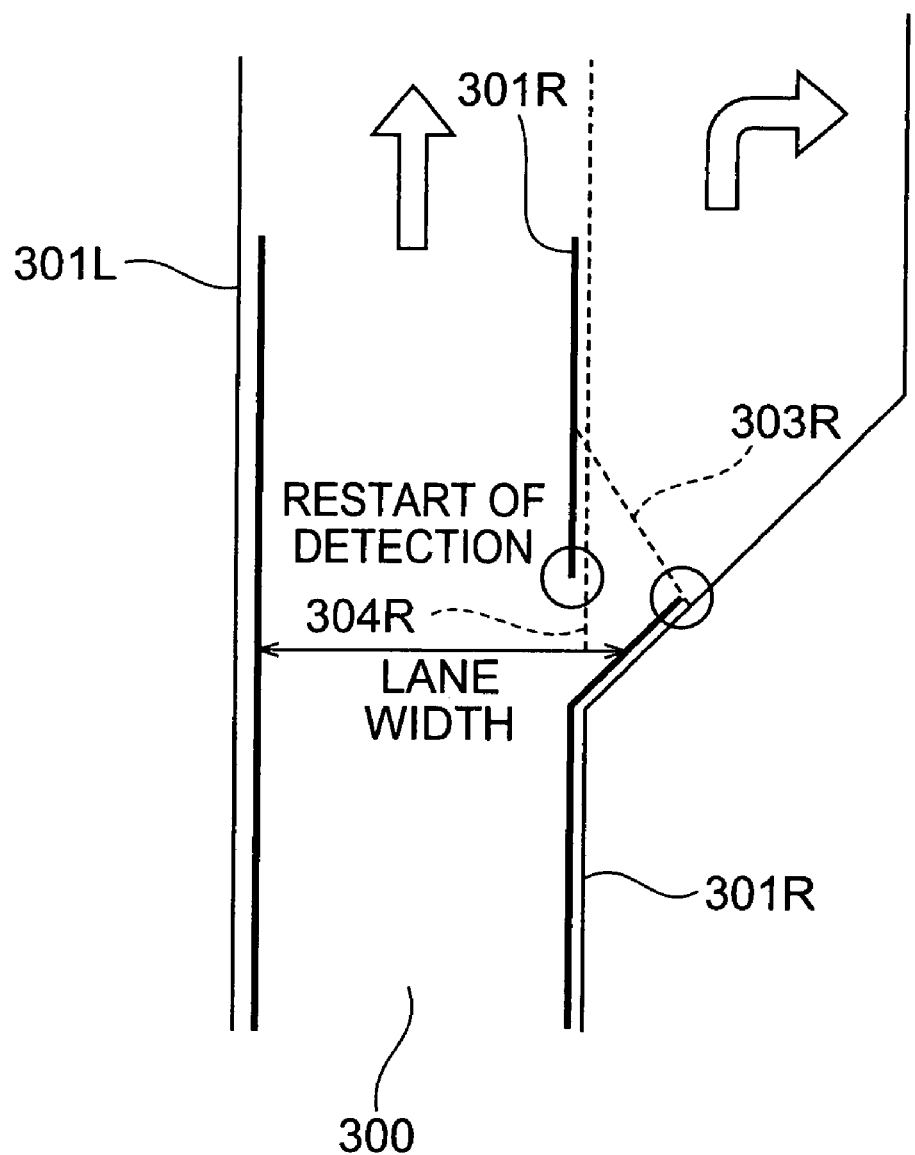
FIG. 8 is a drawing for explaining a recognized lane in a situation in which no white line is detected.

FIG. 8 is a drawing for explaining a situation in which such failure of detection of a white line occurs. If only the processing of FIG. 3 is preformed without the processing of FIG. 7, the lane width outputted from the image processor 21 will be 0 in the non-detected state of the white line. For this reason, the lane width is decreased along a virtual white line 303R with the use of the lane-width decrease allowance from the final detection position. Even if the image processor 21 then restarts detection of the white line and if a change amount from the virtual white line 303R to the detected white line 301R exceeds the allowance, the extended virtual white line 303R will be used instead of the detected white line 301R. Therefore, if the virtual white line is located outside the white line, an alarm failure will occur. If the virtual white line is located inside the detected white line, an error alarm will be issued.

The processing of FIG. 7 is to reset the position of the white line with occurrence of detection failure of the white line and to change the position of the white line to a position of a virtual white line 304R, whereby a difference can be made small between the position of the actual white line 301R and the position of the virtual white line 304R at the time of restart of detection. Since the place approximately coincident with the actual traffic lane can be recognized as a traffic lane even during the period to the restart of detection, it is feasible to suppress occurrence of alarm failure and error alarm.

The above description was given using the example where the lane width was used as traffic lane information, but the guard process may also be carried out for each of the left and right white line positions, for example. It is also possible to perform the guard process for a position of a center of the traffic lane. In these cases, it is preferable to perform the processing corresponding to FIG. 7 in the undetected case. A method of vibrating the steering wheel can also be executed as a method of giving an alarm through the steering wheel.

The technique of restraining the time change rate to within the predetermined guard values was described as a technique of guarding the time change rate, but the guard technique is not limited to the technique of restraining the time change rate to within the guard values set according to the vehicle speed as long as a larger time change rate is permitted in the high vehicle speed case than in the low vehicle speed case. For example, it is also possible to adopt a technique of setting the permitted time change rate according to a vehicle state quantity except for the vehicle speed, or a state of the traffic lane even at the same vehicle speed. When the permitted time change rate is set in this manner, the technique of setting the time change rate in the lane expanding case and in the lane decreasing case may also be set in the same manner as in the case where the time change rate is restrained to within the predetermined guard values as described above.

The present invention was described using the example of the vehicle deviation prevention controller for determining a vehicle deviation and issuing an alarm, but the present invention is also suitably applicable to determination of deviation in apparatus for automatically correcting steering to avoid deviation, based on the determination, and in apparatus for performing a collision alleviating control, based on the determination.

INDUSTRIAL APPLICABILITY

According to the present invention, even in the case where the traffic lane is erroneously detected (e.g., where error recognition occurs in recognition of an image in which the traffic lane information is acquired by image recognition), the time change rate thereof is restrained to be guarded, whereby an extreme variation of the traffic lane is suppressed, so as to prevent the trouble (error alarm or alarm failure) due to the error recognition. This time change rate is set larger according to the vehicle speed, and thus the guard values are set small in the low vehicle speed range to suppress occurrence of error alarm. Roads with the lane width itself largely varying against distance (also including cases caused by error recognition) are mostly roads on which vehicles drive at relatively low speed, and such variation is less likely to occur on roads on which vehicles drive at high speed. Even with an identical change amount against distance, the time change rate is larger in the high speed range than in the low speed range. Therefore, the permitted time change rate is set larger in the high speed range, so as to suppress occurrence of the trouble.

The invention claimed is:

1. A vehicle deviation determining apparatus comprising:
   traffic lane detecting means for detecting a traffic lane of a road on which a host vehicle is driving;
   deviation determining means for determining whether the host vehicle will deviate from the traffic lane, based on a positional relation between the traffic lane and the host vehicle; and
   means for detecting a vehicle speed,
   wherein the traffic lane detecting means detects the traffic lane at a predetermined position, and wherein when a change amount per predetermined time of a lane width of the detected traffic lane exceeds a threshold, the traffic lane detecting means sets a lane width in the traffic lane so that the change amount does not exceed the threshold,
   wherein the deviation determining means determines whether the host vehicle will deviate from the traffic lane, based on the lane width thus set, and
   wherein the traffic lane detecting means sets the threshold larger at a high vehicle speed than at a low vehicle speed.

2. A vehicle deviation determining apparatus according to claim 1, wherein when a position of one edge of the traffic lane is not detected, the traffic lane detecting means sets a predetermined lane width as the lane width in the traffic lane.

3. A vehicle deviation determining apparatus according to claim 1, wherein the traffic lane detecting means sets the threshold in a case where the lane width of the traffic lane increases, different from that in a case where the lane width of the traffic lane decreases.

4. A vehicle deviation determining apparatus according to claim 1, wherein the traffic lane detecting means sets the threshold larger in a case where the lane width of the traffic lane increases, than in a case where the lane width of the traffic lane decreases.

5. A vehicle deviation determining apparatus comprising:
   traffic lane detector that detects a traffic lane ahead a host vehicle;
   deviation determiner that determines whether the host vehicle will deviate from the traffic lane, based on a positional relation between the traffic lane and the host vehicle; and vehicle speed detector that detects a vehicle speed of the host vehicle, wherein when a change amount per predetermined time of a lane width of the detected traffic lane exceeds a threshold, die traffic lane detector sets a lane width of the traffic lane so that the change amount does not exceed the threshold, wherein the deviation determiner determines whether the host vehicle will deviate from the traffic lane, based on the lane width thus set, and wherein the traffic lane detector sets the threshold larger at a high vehicle speed than at a low vehicle speed.

6. A vehicle deviation determining apparatus according to claim 5, wherein when a position of one edge of the traffic lane is not detected, the traffic lane detector sets a predetermined lane width as the lane width of the traffic lane.

7. A vehicle deviation determining apparatus according to claim 5, wherein the traffic lane detector sets the threshold in a ease where the lane width of the traffic lane increases, different From that in a case where the lane width of the traffic lane decreases.

8. A vehicle deviation determining apparatus according to claim 5, wherein the traffic lane detector sets the threshold larger in a case where the lane width of the traffic lane increases, than in a case where the lane width of the traffic lane decreases.

* * * * *